United States Patent
Casoli

(12) 
(10) Patent No.: US 9,400,116 B2
(45) Date of Patent: Jul. 26, 2016

(54) DEVICE FOR EXTRACTOR HOOD

(75) Inventor: Francesco Casoli, Fabriano (IT)

(73) Assignee: ELICA S.P.A., Fabriano (IT)

( * ) Notice: Subject to any disclaimer, the term of this patent is extended or adjusted under 35 U.S.C. 154(b) by 412 days.

(21) Appl. No.: 14/234,733

(22) PCT Filed: Aug. 4, 2011

(86) PCT No.: PCT/IT2011/000290
§ 371 (c)(1),
(2), (4) Date: Mar. 18, 2014

(87) PCT Pub. No.: WO2013/018116
PCT Pub. Date: Feb. 7, 2013

(65) Prior Publication Data
US 2014/0283813 A1 Sep. 25, 2014

(51) Int. Cl.
| | | |
|---|---|---|
| *G01F 1/78* | (2006.01) | |
| *F24C 15/20* | (2006.01) | |
| *G01F 1/28* | (2006.01) | |
| *F16K 31/12* | (2006.01) | |
| *F04D 25/14* | (2006.01) | |

(52) U.S. Cl.
CPC . *F24C 15/20* (2013.01); *G01F 1/28* (2013.01); *F04D 25/14* (2013.01); *F16K 31/12* (2013.01)

(58) Field of Classification Search
CPC ......... F24C 15/20; F16K 31/12; F04D 25/14; G01F 1/28
USPC ............ 126/299 D, 299 R, 77; 454/343, 340; 73/861.18, 54; 431/20, 63
See application file for complete search history.

(56) References Cited

U.S. PATENT DOCUMENTS

| | | | |
|---|---|---|---|
| 4,312,235 A | 1/1982 | Daigle | |
| RE31,312 E * | 7/1983 | Eddens | G01L 5/10 73/862.382 |
| 4,796,651 A * | 1/1989 | Ginn | G01F 1/22 137/487 |
| 5,372,544 A | 12/1994 | Gervais | |
| 5,540,619 A * | 7/1996 | Ahmed | F24F 11/04 454/256 |
| 6,059,260 A * | 5/2000 | Jacob | F16K 31/046 251/129.12 |
| 6,358,137 B1 * | 3/2002 | Threlfall | B08B 15/023 454/61 |
| 2004/0035411 A1 | 2/2004 | Livchak et al. | |
| 2005/0224069 A1 | 10/2005 | Patil et al. | |
| 2006/0070617 A1 * | 4/2006 | Yamada | F24C 15/2035 126/299 D |
| 2011/0094496 A1 * | 4/2011 | McCown | F23L 11/00 126/289 |

FOREIGN PATENT DOCUMENTS

| | | |
|---|---|---|
| DE | 3044219 A1 | 6/1982 |
| DE | 3404004 A1 | 10/1984 |
| WO | 9748479 | 12/1997 |

* cited by examiner

*Primary Examiner* — Gregory Huson
*Assistant Examiner* — Nikhil Mashruwala
(74) *Attorney, Agent, or Firm* — Pearne & Gordon LLP

(57) ABSTRACT

The present invention concerns a device (2) for an extractor hood (1) comprising a tubular portion (21), having a cross section from 5000 to 32000 mm2, wherein an air flow detector (23) is arranged in said tubular portion (21), for detecting the air flow in said tubular portion (21).

7 Claims, 3 Drawing Sheets

DEVICE FOR EXTRACTOR HOOD

TECHNICAL FIELD

The present invention relates to a device for an extractor hood.

BACKGROUND OF THE INVENTION

Extractor hoods have become a common feature in kitchens, due to their undisputed effectiveness in odor extraction. Current technological advances have led these appliances to much better performances than before, by increasing both operational versatility and extraction power.

There are typically two types of hoods: extraction hoods and filter hoods.

Extraction hoods extract air from the outside environment (e.g. the kitchen) and force it out of the environment from which it was drawn, e.g. out of the apartment or house.

On the other hand, filter hoods reintroduce the air they drew into the same environment, after appropriate filtering.

In certain countries, such as the United States of America, regulations have been approved (e.g. UL 507/CSA C22.2 no. 113), which impose that the environment from which the extractor hood draws air have a connection with the outside, if the flow of extracted air is higher than a given limit.

The simplest way to meet this requirement is to form a hole in the wall of the inside environment to permanently allow communication thereof with the outside environment.

Of course, such solution has a number of drawbacks, especially when the temperature of the outside environment is not optimal as compared with that of the inside environment (e.g. in Summer, when the inside environment may be conditioned, or in Winter when the inside environment may be heated).

In the light of the above described prior art, the object of the present invention is to provide an arrangement other than the one described above, to increase thermal efficiency in the environment in which the extractor hood is located.

Furthermore, the present invention affords advantages in terms of simple fabrication, greater strength, more compact design and/or higher versatility.

SUMMARY OF THE INVENTION

According to the present invention, the above object is fulfilled by a device for an extractor hood comprising a tubular portion, having a cross section from 5000 to 32000 $mm^2$, wherein an air flow detector is arranged in said tubular portion, for detecting the air flow in said tubular portion.

BRIEF DESCRIPTION OF THE DRAWINGS

The characteristics and advantages of the present invention will appear from the following detailed description of one practical embodiment, which is given as a non limiting example with reference to the annexed drawings, in which.

DETAILED DESCRIPTION

Figure 1:
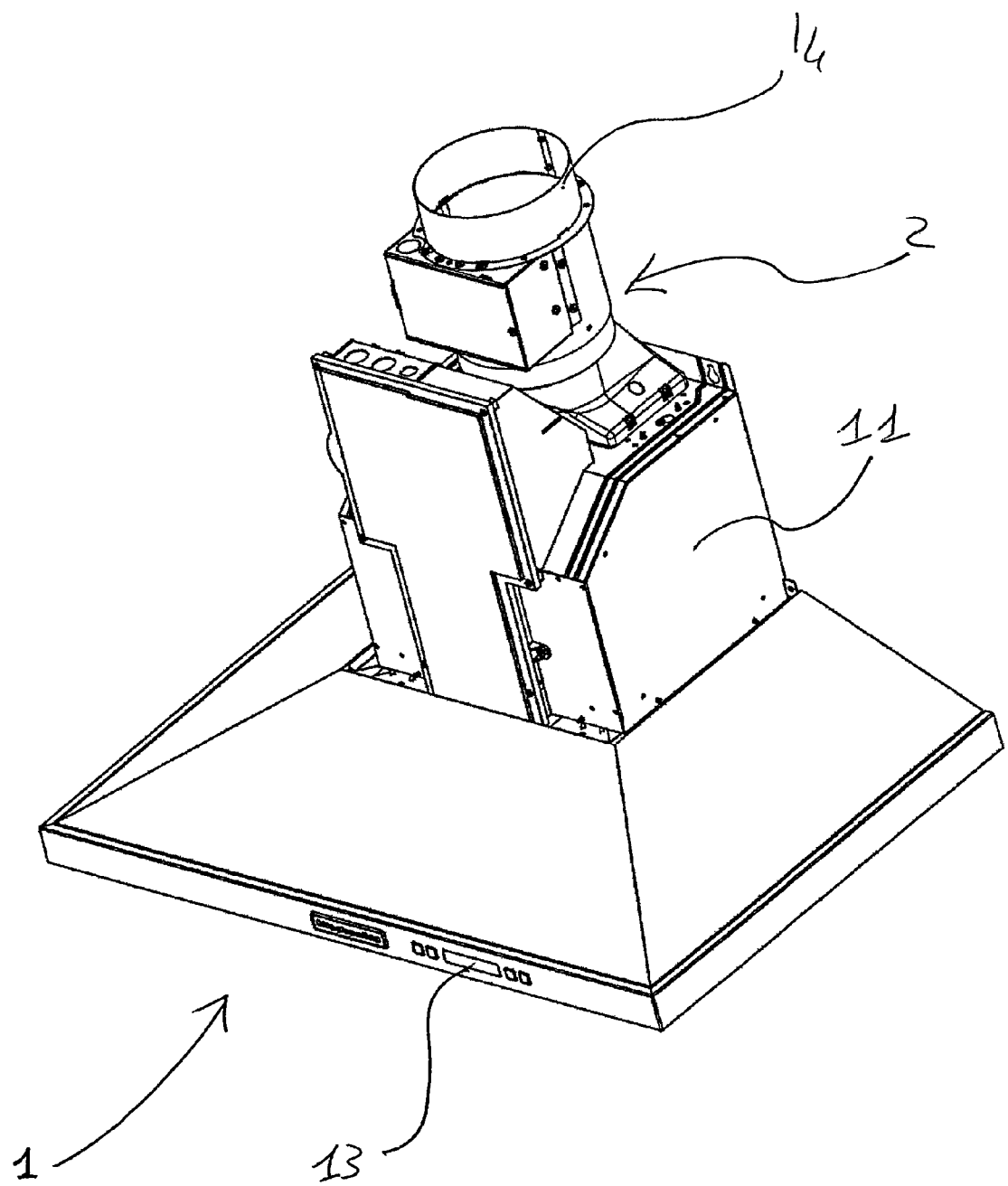
FIG. 1 shows a perspective view of an extractor hood comprising a device according to a preferred embodiment of the present invention.
Figure 2:
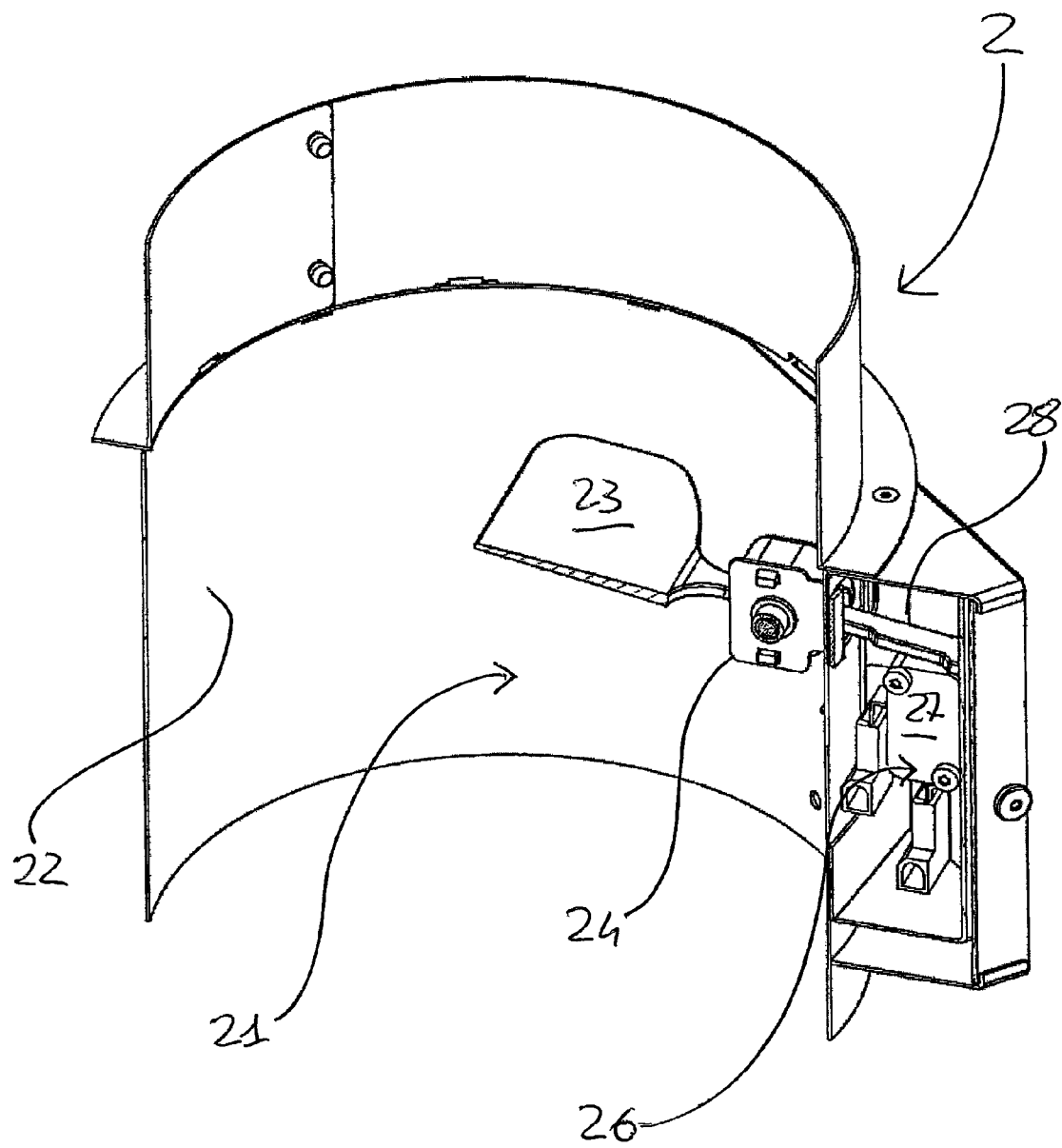
FIG. 2 shows a broken-away perspective view of the device of FIG. 1.

Although this is not expressly shown, the individual features described with reference to each embodiment shall be intended as auxiliary and/or interchangeable with other features, as described with reference to other embodiments.

Reference will be simply made herein to a hood installed in a kitchen, such as a domestic kitchen.

Of course, the technical concepts as disclosed herein may be equally understood if the hood is installed in an environment other than a domestic kitchen, for instance if it is installed in a kitchen of a restaurant or another indoor environment.

The extractor hood, generally referenced 1 in the figures, typically comprises a chassis 11, an extractor motor (not shown), a control panel 13 connected to the extractor motor to regulate operation thereof, and an exhaust duct 14, for exhausting fumes and vapors outside the kitchen or into a specially provided chimney flue.

Additional components may be filters, one or more lighting elements, possibly controlled by the same control panel 13 or a different control panels, and structural elements for fixation to existing or specially provided fixtures in the kitchen.

The present invention relates to a device, referenced 2 in the figures, for the extractor hood 1. Such device 2 is designed to be mounted in series to the exhaust duct 14.

Therefore, the device 2 comprises a tubular portion 22, having a preferably circular or substantially rectangular section (although a different section may be also provided), and preferably extending along a predetermined longitudinal, preferably straight axis X-X (curvilinear arrangements, such as elbows, possibly 90° elbows, may be also provided, as the skilled person may appreciate from the present disclosure).

An air flow detector (or an anemometer) 21 is placed within the tubular portion 22.

In terms of cross section perpendicular to the axis X-X, the area of the section of the tubular portion 22 ranges from about 5000 $mm^2$ to about 32000 $mm^2$, which correspond, in a device 2 having a circular section, to a diameter ranging from 80 to 200 mm.

The air flow detector 21 may be a hot-wire anemometer, a Pitot tube, a cup anemometer or another kind of detector that can detect the air flow with adequate accuracy.

In a preferred embodiment, the detector 21 is of mechanical type, e.g. comprising an element 23 disposed transverse to the axis X-X, preferably perpendicular to such axis.

Advantageously, the element 23 has a flat surface, e.g. facing towards the side of the device 2 that is designed to face towards the hood side 1, when installed.

According to a preferred embodiment, the element 23 comprises a thin plate; e.g. the element 23 may be substantially a sheet, typically made of metal, such as steel, gold, silver.

The element 23 may be joined to the tubular portion 22 by a constraint 24 that allows a limited degree of angular displacement, such as a hinge, or a device that allows a limited linear displacement (not shown).

The device 2 may further comprise a counteracting element (not shown), such as an elastic element or a spring (or two springs, located on either side, or more), capable of pressing or urging the element 23 to an equilibrium position, in which it is substantially transverse or in which it is perpendicular to the axis X-X (coinciding with the air flow direction designed during use).

Therefore, during operation of the hood 1, the element 23 is displaced from its equilibrium position by the air flow through the device 2 due to the force exerted by the air flow on the element 23.

The displacement of the element 23 from its equilibrium position obviously depends on a number of factors but, assuming that the device 2 is the same, it will only depend on the air speed through the device.

Therefore, the displacement of the element 23 will determine with adequate accuracy the extraction capacity of an extractor hood 1 connected in series therewith, whereby detection of the angular displacement of the element 23 will provide the air flow extracted by the extractor hood 1 from the environment in which the latter is installed, such as a kitchen.

Therefore, the device 2 may include a detector 26 for detecting the displacement of the element 23 from its equilibrium position.

The sensitivity of the detector 26 may range from a very high sensitivity to a sensitivity that only allows detection of a displacement corresponding to an air flow equal to or higher than a preset limit, e.g. the limit imposed by local standards.

For instance, the detector 26 may be able to generate a threshold signal Ss as a predetermined air flow is exceeded, or a first threshold signal Ss1 as the predetermined air flow is exceeded and a second threshold signal Ss2 as the air flow in the device 1 returns below the predetermined air flow.

Considering the above mentioned US standards, for instance, such limit is 400 cubic feet per minute (about 680 cubic feet per hour).

In a preferred embodiment, such detector 26 may be a microswitch 27 located in a position in which it is triggered as a particular displacement threshold is exceeded.

For instance, the microswitch 27 may be actuated by a lug 28, joined or formed of one piece with the element 23.

For instance, the lug 28 may be substantially elongate along an axis transverse to the axis X-X, e.g. along an axis coplanar with the flat surface of the element 23.

The lug 28 may be placed on the side opposite to the constraint 24, or on the same side as the latter.

When the element 23 is in its rest position, it may obstruct a part of the total section of the tubular portion; such part may be more than 5%, advantageously more than 10% or 15%, e.g. more than 20%, and/or less than 70%, than 60% or 50%, e.g. less than 40%.

In a preferred embodiment, the device 1 comprises a control element 3 capable of receiving the threshold signal Ss generated by the detector 26 and of transmitting it to an external element 4, such as a closure element 41 for closing a passage formed between the environment in which the extractor hood 1 is installed and the outside environment.

Advantageously, the closure element 41 comprises a frame 42 with a passage 43 and a movable diaphragm 44, which is adapted to selectively obstruct the passage 43.

Figure 3:
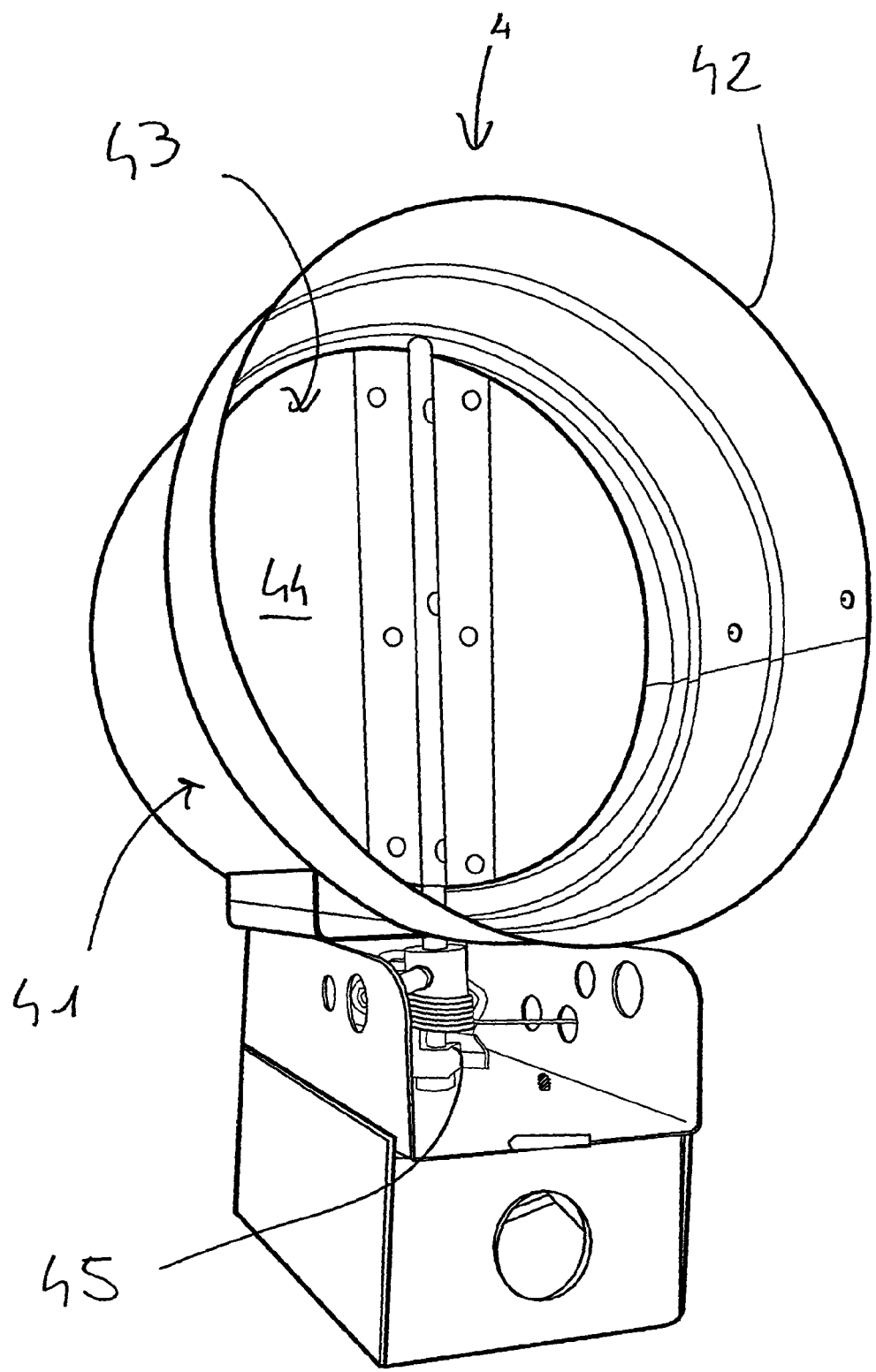
FIG. 3 shows a perspective view of an outer element designed to cooperate with the hood of FIG. 1.

The movable diaphragm may include one or more strips, as shown in FIG. 3, or be formed in another equivalent manner.

The frame 42 and the passage 43 are of such a size as to allow an installation operator to form a passage between the kitchen (or more generally the environment in which the extractor hood 1 is installed) and the outside environment, to meet any relevant standard.

The external element 4 may include a control and monitoring device 45 for receiving the threshold signal/s Ss, Ss1, Ss2 generated by the detector 26 and, for instance, causing the movable diaphragm 44 to open and/or close upon receipt of the threshold signal.

For example, the movable diaphragm 44 may be controlled to leave the passage open 43 while the threshold signal Ss is being transmitted, or during the time between receipts of the first and second threshold signals Ss1, Ss2.

Those skilled in the art will obviously appreciate that a number of changes and variants may be made to the arrangements as described hereinbefore to meet specific needs, e.g. by changing the way in which the signal for opening and closing the movable diaphragm 44 is transmitted or received, as long as the relevant standard is met.

All of these variants and changes fall within scope of the invention, as defined in the following claims.

The invention claimed is:

1. An extractor hood comprising:
   a tubular portion, having a cross section from 5000 to 32000 mm$^2$;
   an air flow detector is arranged in said tubular portion, for detecting the air flow in said tubular portion, said detector comprises a movable element that is capable to move around an equilibrium position;
   a displacement detector for detecting the displacement of said detector about said equilibrium position,
   said displacement detector is a micro switch being actuated by a lug joined or formed of one piece with said movable element
   a control element capable of receiving a threshold signal generated by said micro switch and of transmitting it to an external element for closing a passage formed between the environment in which the extractor hood is installed and the outside environment.

2. The extractor hood according to claim 1, wherein said lug is elongate along an axis traverse to an axis X-X of said movable element.

3. The extractor hood according to claim 2, wherein said movable element is planar.

4. The extractor hood according to claim 3, wherein said axis of said lug is extended along an axis coplanar with the planar surface of the movable element.

5. The extractor hood according to claim 1, wherein said movable element is joined to said tubular portion by a constraint.

6. The extractor hood according to claim 5, wherein said lug is placed on the side opposite to said constraint or on the same side as the latter.

7. A kit comprising:
   an extractor hood having a tubular portion, having a cross section from 5000 to 32000 mm$^2$, an air flow detector is arranged in said tubular portion, for detecting the air flow in said tubular portion, said detector comprises a movable element that is capable to move around an equilibrium position, a displacement detector for detecting the displacement of said detector about said equilibrium position, said displacement detector is a micro switch being actuated by a lug joined or formed of one piece with said movable element, a control element capable of receiving a threshold signal generated by said micro switch, and
   an external element comprising a frame that defines a passage, a movable diaphragm adapted to selectively close said passage and a control and monitoring device adapted to actuate said movable diaphragm to open and close said passage, wherein said micro switch is adapted to be operably connected to said control and monitoring device so that, when said extractor hood is operably connected to said external element, said movable diaphragm leaves said passage open when the air flow through said device exceeds a preset value and said movable diaphragm leaves said passage closed when the air flow through said device is lower than said preset value.

* * * * *